United States Patent
Wang et al.

(10) Patent No.: US 11,975,617 B2
(45) Date of Patent: May 7, 2024

(54) LOWER BOX BODY, BATTERY PACK AND VEHICLE

(71) Applicant: CONTEMPORARY AMPEREX TECHNOLOGY CO., LIMITED, Ningde (CN)

(72) Inventors: Zhichao Wang, Ningde (CN); Peng Wang, Ningde (CN)

(73) Assignee: CONTEMPORARY AMPEREX TECHNOLOGY CO., LIMITED, Ningde (CN)

( * ) Notice: Subject to any disclaimer, the term of this patent is extended or adjusted under 35 U.S.C. 154(b) by 371 days.

(21) Appl. No.: 17/469,979

(22) Filed: Sep. 9, 2021

(65) Prior Publication Data

US 2021/0402884 A1 Dec. 30, 2021

Related U.S. Application Data

(63) Continuation of application No. PCT/CN2020/106461, filed on Jul. 31, 2020.

(30) Foreign Application Priority Data

Sep. 19, 2019 (CN) .......................... 201921564496.X (51) Int. Cl.
*B60L 50/00* (2019.01)
*B60K 1/04* (2019.01)
(Continued)

(52) U.S. Cl.
CPC ................ *B60L 50/66* (2019.02); *B60K 1/04* (2013.01); *H01M 50/204* (2021.01);
(Continued)

(58) Field of Classification Search
CPC ... B60K 1/04; B60K 2001/0438; B60L 50/66; H01M 50/249; H01M 50/204; H01M 50/317
(Continued)

(56) References Cited

U.S. PATENT DOCUMENTS 7,654,352 B2 * 2/2010 Takasaki ............. H01M 50/278
180/68.5
8,084,156 B2 * 12/2011 Okuda ................ H01M 10/633
429/62
(Continued)

FOREIGN PATENT DOCUMENTS

CN 207409561 U 5/2018
CN 109968999 A 7/2019
(Continued)

OTHER PUBLICATIONS

International Search Report dated Oct. 30, 2020 issued in PCT/CN2020/106461.

*Primary Examiner* — Hau V Phan
(74) *Attorney, Agent, or Firm* — Scully, Scott, Murphy & Presser, P.C.

(57) ABSTRACT

A lower box body, a battery pack and a vehicle, where the battery pack includes the lower box body and a battery cell; the lower box body has an accommodating area, and the battery cell is accommodated in the accommodating area; the lower box body is further provided with an exhaust port and an exhaust channel, and the exhaust port is in communication with the exhaust channel; the exhaust port is arranged in the lower box body of corresponding accommodating area; and the lower box body further includes an exhaust assembly, the exhaust assembly is blocked at the exhaust port, and the exhaust assembly is configured to be open when pressure in the accommodating area reaches a set
(Continued)

value, so that gas in the accommodating area enters the exhaust channel through the exhaust port.

19 Claims, 7 Drawing Sheets

(51) Int. Cl.
    *B60L 50/60*     (2019.01)
    *H01M 50/204*     (2021.01)
    *H01M 50/249*     (2021.01)
    *H01M 50/317*     (2021.01)

(52) U.S. Cl.
    CPC ....... *H01M 50/249* (2021.01); *H01M 50/317* (2021.01); *B60K 2001/0438* (2013.01); *H01M 2220/20* (2013.01)

(58) Field of Classification Search
    USPC ....................................................... 180/68.5
    See application file for complete search history.

(56) References Cited

U.S. PATENT DOCUMENTS

| | | | |
|---|---|---|---|
| 8,936,125 B2* | 1/2015 | Nakamori | H01M 50/249 |
| | | | 220/651 |
| 9,685,682 B2* | 6/2017 | Hoshi | H01M 10/4207 |
| 10,486,516 B2* | 11/2019 | Yamanaka | B62D 21/02 |
| 10,720,683 B2* | 7/2020 | Obasih | H01M 10/625 |
| 2009/0197154 A1* | 8/2009 | Takasaki | H01M 10/625 |
| | | | 429/83 |
| 2011/0174556 A1* | 7/2011 | Hermann | B60L 50/64 |
| | | | 429/62 |
| 2019/0198835 A1 | 6/2019 | Oki et al. | |

FOREIGN PATENT DOCUMENTS

| | | |
|---|---|---|
| CN | 209104230 U | 7/2019 |
| CN | 110190212 A | 8/2019 |
| CN | 209401662 U | 9/2019 |
| CN | 209401710 U | 9/2019 |
| CN | 210110904 U | 2/2020 |
| KR | 20170135469 A | 12/2017 |

* cited by examiner

LOWER BOX BODY, BATTERY PACK AND VEHICLE

This application is a continuation of International Application No. PCT/CN2020/106461, filed on Jul. 31, 2020, which claims priority to Chinese Patent Application No. 201921564496.X, filed with the Chinese Patent Office on Sep. 19, 2019 and entitled "LOWER BOX BODY, BATTERY PACK AND VEHICLE", which is incorporated herein by reference in its entirety.

TECHNICAL FIELD

This application relates to the field of energy storage device technologies, and in particular, to a lower box body, a battery pack and a vehicle.

BACKGROUND

As an important part of new energy vehicles, a battery pack has extremely important safety performance. The battery pack includes a plurality of battery cells. Once thermal runaway occurs in the battery cell, generated gas may be discharged through an explosion-proof valve of the battery pack.

However, because a position of a battery cell in which thermal runaway occurs in the plurality of battery cells is uncontrollable, once thermal runaway occurs, generated gas may cause chain thermal runaway of other battery cells. Therefore, it is necessary to design a new battery pack to prevent the battery cell from affecting other battery cells when thermal runaway occurs.

SUMMARY

The embodiments of this application provide a lower box body, a battery pack and a vehicle to resolve the problem in the prior art and improve safety performance of the battery pack.

A first aspect of the embodiments of this application provides a lower box body, including:

The lower box body has an accommodating area for accommodating a battery cell; the lower box body is further provided with an exhaust port and an exhaust channel, and the exhaust port is in communication with the exhaust channel; the exhaust port is arranged in the corresponding accommodating area; and the lower box body further includes an exhaust assembly, the exhaust assembly is blocked at the exhaust port, and the exhaust assembly is configured to be open when pressure in the accommodating area reaches a set value, so that gas in the accommodating area enters the exhaust channel through the exhaust port.

As a possible design, the exhaust assembly includes a ventilation frame and a baffle; the ventilation frame is close to the accommodating area relative to the baffle; the ventilation frame is connected to a periphery of the exhaust port, and the ventilation frame and the baffle are rotatably connected; when the pressure of the accommodating area does not reach the set value, the baffle covers the ventilation frame; and when the pressure of the accommodating area reaches the set value, the baffle rotates and opens to allow the gas to penetrate the ventilation frame and enter the exhaust channel.

As a possible design, the ventilation frame includes a first body and a first connection part that are connected; the first body is in a mesh structure; the baffle includes a second body and a second connection part that are connected;

the exhaust assembly further includes a rotating shaft; the first connection part and the second connection part are rotatably connected through the rotating shaft;

when the pressure of the accommodating area does not reach the set value, the second body covers the first body; and when the pressure of the accommodating area reaches the set value, the second body is separated from the first body, so that the gas penetrates the first body and enters the exhaust channel.

As a possible design, the first connection part includes more than two fixing lugs, and a fixing lug is provided with a first fixing hole; the second connection part includes more than two fixing posts, and the fixing post is provided with a second fixing hole; and each fixing post is arranged between adjacent fixing lugs, and the rotating shaft passes through the first fixing hole and the second fixing hole to connect the fixing post with the fixing lug.

As a possible design, the rotating shaft includes a third body, a first restraint member and a second restraint member, the first restraint member and the second restraint member being connected to both ends of the third body; the third body passes through and is arranged in the first fixing hole and the second fixing hole; and the first restraint member and the second restraint member are configured to limit axial X movement of the fixing post.

As a possible design, the ventilation frame is provided with a first attraction component; the baffle is provided with a second attraction component; and the ventilation frame and the baffle are attracted through the first attraction component and the second attraction component.

As a possible design, a sealing component is arranged between the ventilation frame and the baffle.

As a possible design, the lower box body includes a lateral beam, a transverse beam, a medial transverse beam, and a medial vertical beam; the lateral beam and the transverse beam are connected end to end to form a frame structure; the medial transverse beam and the medial vertical beam are cross-connected in the frame structure, and the medial transverse beam, the medial vertical beam and the lateral beam and/or the transverse beam form the accommodating area; and the exhaust assembly is arranged on the medial vertical beam and/or the lateral beam.

As a possible design, the accommodating area includes more than two areas; and each accommodating area is provided with the exhaust port and the exhaust assembly.

As a possible design, the exhaust assembly is welded or adhered to the lower box body on the periphery of the exhaust port.

A second aspect of the embodiments of this application provides a battery pack, including a battery cell, where the battery pack further includes the lower box body according to any one of the foregoing descriptions, and the battery cell is accommodated in the accommodating area.

A third aspect of the embodiments of this application provides a vehicle, including the foregoing battery pack.

The technical solutions provided in the embodiments of this application have the following beneficial effects:

In the lower box body, the battery pack, and the vehicle provided in the embodiments of this application, the lower box body has an accommodating area, and the battery cell is accommodated in the accommodating area. The lower box body is further provided with the exhaust port and the exhaust channel, and the exhaust assembly is set to be open when the pressure of the accommodating area reaches the set value, so that gas in the accommodating area enters the exhaust channel through the exhaust port. In the battery pack provided in the embodiments of this application, once thermal runaway occurs in a battery cell, it will produce a large amount of high-temperature gas inside. The high-temperature gas can penetrate the exhaust assembly and enter the exhaust channel, and then be discharged to the outside of the battery pack. In this way, the probability of thermal runaway of adjacent battery cells can be reduced, thereby improving safety performance of the battery pack.

It should be understood that the general description above and the following details are only exemplary and cannot limit this application.

BRIEF DESCRIPTION OF THE DRAWINGS

To illustrate the implementations of this application or the technical solutions in the prior art more clearly, the following will briefly introduce the drawings that need to be used in the implementations or description of the prior art. Obviously, the drawings described below are implementations of this application, and for a person of ordinary skill in the art, other drawings may also be obtained based on these drawings without creative work.

REFERENCE SIGNS

100—battery pack;
1—lower box body;
11—lateral beam;
12—transverse beam;
13—medial transverse beam;
14—medial vertical beam;
141—exhaust port;
142—exhaust channel;
15—exhaust assembly;
151—ventilation frame;
151$a$—first body;
151$b$—first connection part;
151$c$—fixing lug;
151$d$—first fixing hole;
152—baffle;
152$a$—second body;
152$b$—second connection part;
152$c$—fixing post;
152$d$—second fixing hole;
153—sealing component;
154—rotating shaft;
154$a$—third body;
154$b$—first restraint member;
154$c$—second restraint member;
155—first attraction component;
156—second attraction component;
16—accommodating area;
2—box body upper cover;
3—battery cell.

The drawings herein are incorporated into the specification and constitute a part of the specification, showing embodiments that conform to this application, and are used with the specification to explain principles of this application.

DESCRIPTION OF EMBODIMENTS

The technical solutions of this application will be clearly and completely described below in combination with the accompanying drawings. Obviously, the described embodiments are a part of the embodiments of this application, rather than all of the embodiments. Based on the embodiments in this application, all other embodiments obtained by a person of ordinary skill in the art without creative work shall fall within the protection scope of this application.

The terms used in the embodiments of this application are only for the purpose of describing specific embodiments, and are not intended to limit this application. The singular forms of "a" and "the" used in the embodiments and claims of this application are also intended to include plural forms, unless the context clearly indicates other meanings.

It should be understood that the term "and/or" used in this specification is only an association relationship describing associated objects, which means that there can be three types of relationships, for example, A and/or B may mean that there is A alone, there are A and B, and there is B alone. In addition, the character "/" in this specification usually indicates that the associated objects before and after are in an "or" relationship.

It should be noted that the noun of locality such as "upper", "lower", "left", and "right" described in the embodiments of this application are described from the angle shown in the accompanying drawings, and should not be understood as a limitation to the embodiments of this application. In addition, in the context, it should also be understood that when referring to that an element is connected "on" or "under" another element, it can not only be directly connected "on" or "under" another element, but also be indirectly connected "on" or "under" another element through an intermediate element.

Figure 1:
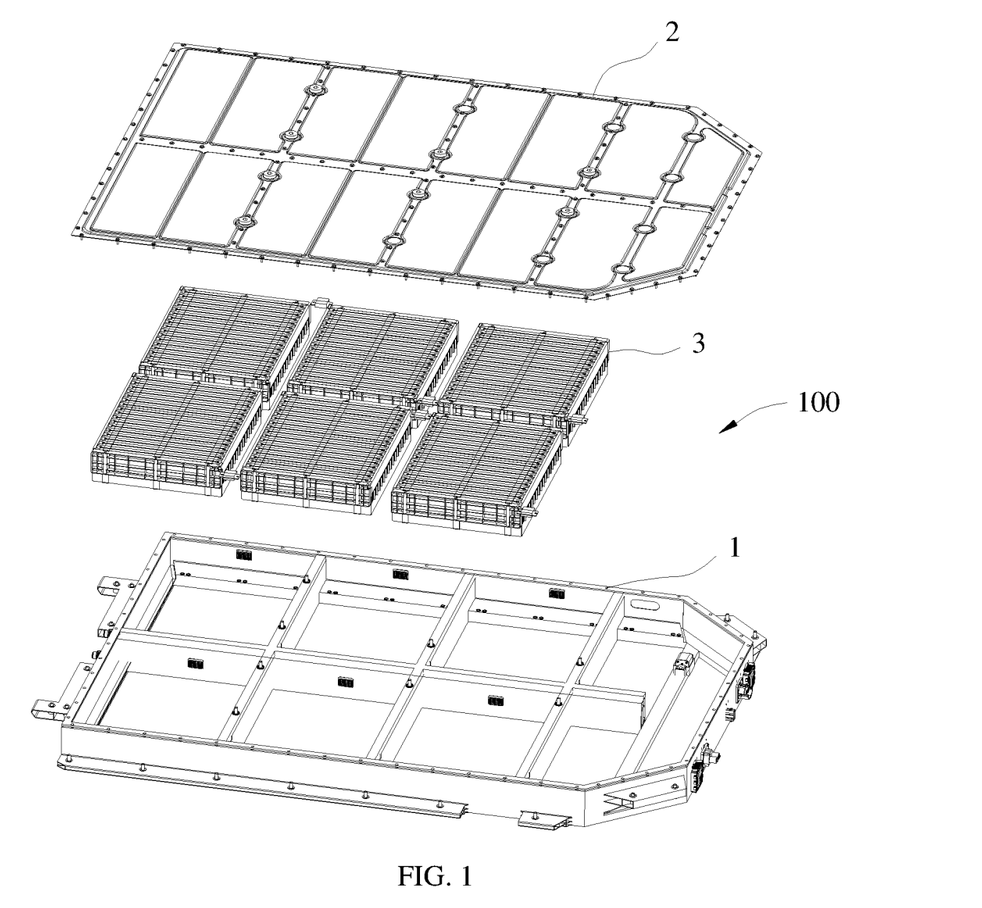
FIG. 1 is a schematic exploded view of a structure of a battery pack according to an embodiment of this application.
Figure 2:
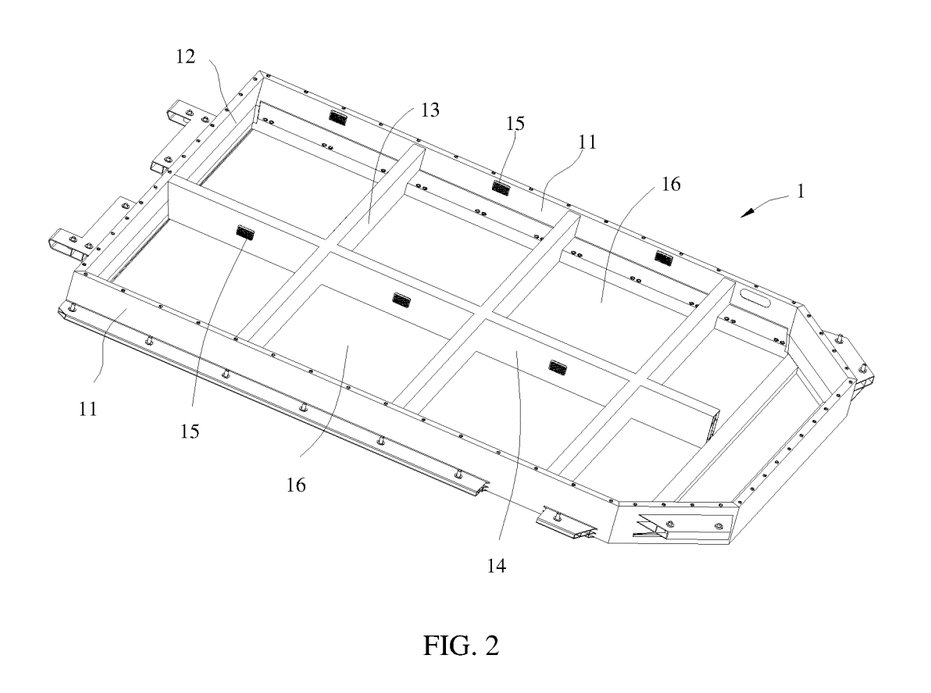
FIG. 2 is a schematic structural diagram of a lower box body according to an embodiment of this application.

FIG. 1 is a schematic exploded view of a structure of a battery pack according to an embodiment of this application, and FIG. 2 is a schematic structural diagram of a lower box body according to an embodiment of this application.

As shown in FIG. 1 and FIG. 2, the embodiment of this application provides a battery pack 100, including a lower box body 1 and a battery cell 3.

The lower box body 1 has an accommodating area 16, there may be a plurality of battery cells 3, and the plurality of battery cells 3 form an array accommodated in the foregoing accommodating area 16. The battery pack 100 may further include a box body upper cover 2, and the box body upper cover 2 is fixed to the lower box body 1 to enclose the battery cell 3 in the lower box body 1.

When thermal runaway occurs in the battery cell 3, a large amount of high-temperature gas will be generated inside the battery cell 3. Once the high-temperature gas is not discharged in time, it will cause a battery cell 3 adjacent to the runaway battery cell 3 to be runaway.

Therefore, the embodiment of this application further provides a lower box body, and the lower box body 1 is further provided with an exhaust port 141 and an exhaust channel 142. The foregoing exhaust port 141 and exhaust assembly 15 may be arranged on a medial vertical beam 14 of the lower box body.

Figure 3:
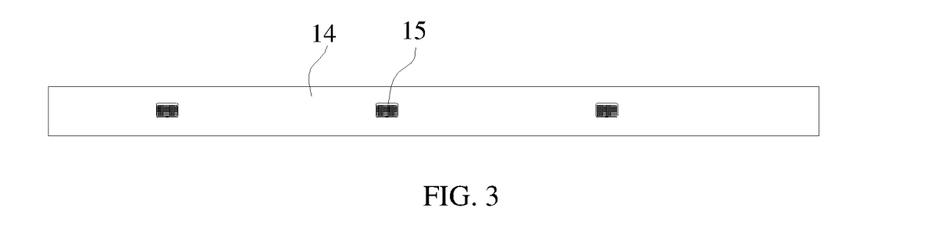
FIG. 3 is a schematic structural diagram of cooperation of a medial vertical beam in the lower box body and an exhaust assembly according to an embodiment of this application.
Figure 4:
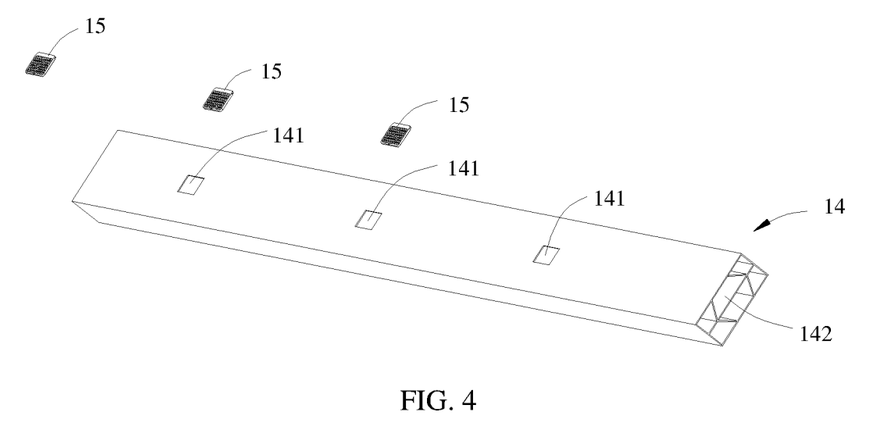
FIG. 4 is a schematic exploded view of cooperation of the medial vertical beam in the lower box body and the exhaust assembly according to an embodiment of this application.

FIG. 3 is a schematic structural diagram of cooperation of the medial vertical beam in the lower box body and the exhaust assembly according to an embodiment of this application, and FIG. 4 is a schematic exploded view of cooperation of the medial vertical beam in the lower box body and the exhaust assembly according to an embodiment of this application.

As shown in FIG. 3 and FIG. 4, in this embodiment, that the exhaust port 141 and the exhaust assembly 15 are arranged on the medial vertical beam 14 is taken as an example for description. A person skilled in the art may understand that the exhaust port 141 and the exhaust assembly 15 may also be arranged in other positions of the lower box body 1.

Specifically, as shown in FIG. 2 to FIG. 4, the exhaust channel 142 is arranged inside the medial vertical beam 14, the exhaust port 141 is in communication with the exhaust channel 142, and the exhaust port 141 is arranged in a corresponding accommodating area 16.

The lower box body 1 further includes the exhaust assembly 15 which is blocked at the exhaust port 141, and the exhaust assembly 15 is configured to be open when a pressure of the accommodating area 16 reaches a set value, so that gas in the accommodating area 16 enters the exhaust channel 142 through the exhaust port 141.

In the battery pack 100 provided in the embodiment of this application, once thermal runaway occurs in a battery cell 3, it will produce a large amount of high-temperature gas inside. The high-temperature gas can penetrate the exhaust assembly 15 and enter the exhaust channel 142, and then be discharged to the outside of the battery pack 100. In this way, probability of thermal runaway of adjacent battery cells 3 can be reduced, thereby improving safety performance of the battery pack 100.

When the foregoing lower box body 1 is processed, the exhaust channel 142 may be molded first. For example, when the medial vertical beam 14 is molded, the exhaust channel 142 is formed, then the exhaust port 141 is processed in the lower box body 1, and the exhaust assembly 15 is installed in the exhaust port 141. In this way, when the pressure of the accommodating area 16 reaches the set value, the exhaust assembly 15 is configured to be opened so that the gas in the accommodating area 16 enters the exhaust channel 142 through the exhaust port 141.

Figure 5:
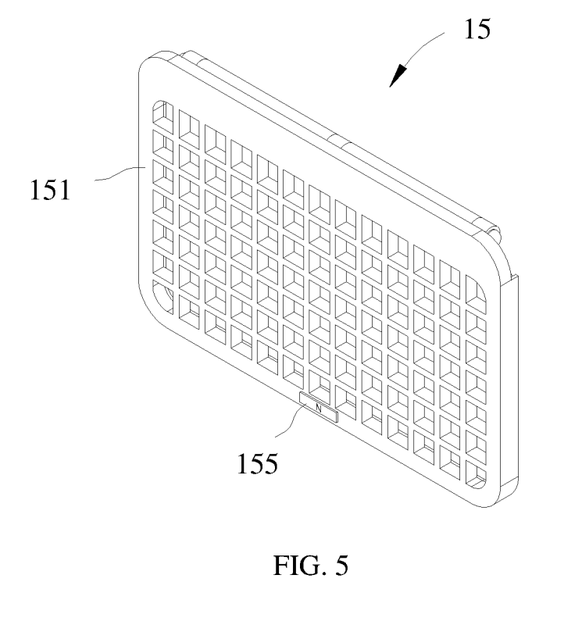
FIG. 5 is a schematic diagram of a closed exhaust assembly in the lower box body according to an embodiment of this application.
Figure 6:
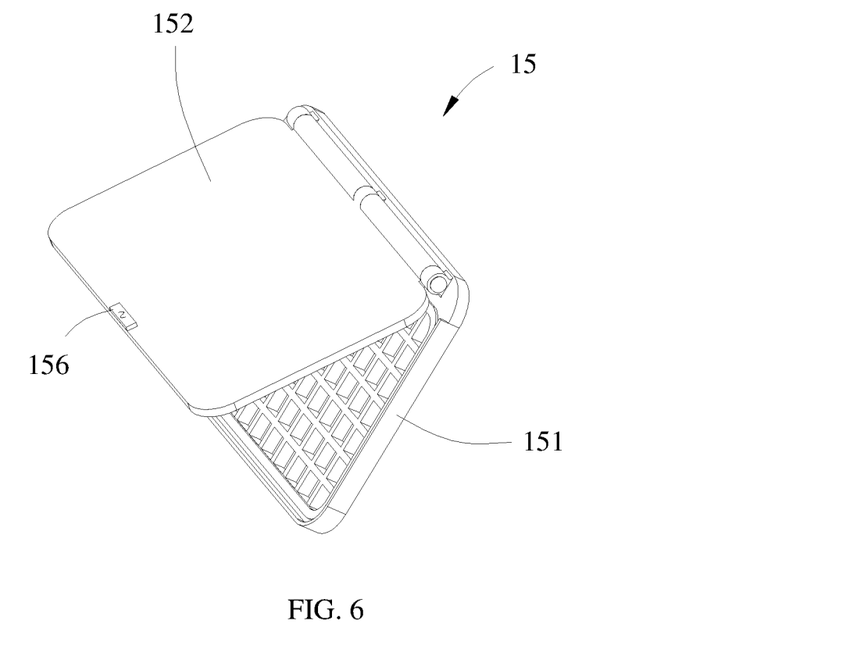
FIG. 6 is a schematic diagram of an open exhaust assembly in the lower box body according to an embodiment of this application.

FIG. 5 is a schematic diagram of a closed exhaust assembly in the lower box body according to an embodiment of this application, and FIG. 6 is a schematic diagram of an open exhaust assembly in the lower box body according to an embodiment of this application.

As a possible implementation, as shown in FIG. 5 and FIG. 6, the exhaust assembly 15 includes a ventilation frame 151 and a baffle 152; and the ventilation frame 151 is close to the battery cell 3 relative to the baffle 152. The ventilation frame 151 is connected to a periphery of the exhaust port 141, and the ventilation frame 151 and the baffle 152 are rotatably connected.

Specifically, the ventilation frame 151 may be fixed on the periphery of the foregoing exhaust port 141, so that when thermal runaway occurs in the battery cell 3, the ventilation frame 151 is fixed and only the baffle 152 rotates and opens in a direction away from the battery cell 3, to exhaust unidirectionally. In this way, the high-temperature gas generated by the battery cell 3 can flow to the outside of the battery pack 100 without flowing back to the accommodating area 16, thereby lowering the temperature of the accommodating area 16 relatively quickly.

When the pressure of the accommodating area 16 does not reach the set value, the baffle 152 covers the ventilation frame 151; and when the pressure of the accommodating area 16 reaches the set value, the baffle 152 rotates and opens to allow the gas to penetrate the ventilation frame 151 and enter the exhaust channel 142.

When thermal runaway occurs in the battery cell 3, a large amount of high-temperature gas is generated inside the battery cell 3, and the high-temperature gas penetrates the ventilation frame 151 and acts on the baffle 152. The baffle 152 rotates and opens under the push of the high-temperature gas, so that the gas may penetrate the ventilation frame 151 and enter the exhaust channel 142, and then be discharged to the outside of the battery pack 100.

The battery pack 100 provided in the embodiment of this application is provided with the exhaust assembly 15 including the ventilation frame 151 and the baffle 152, and the two are configured to be opened and closed relatively rotatably. When thermal runaway occurs in the battery cell 3, the high-temperature gas can penetrate the ventilation frame 151 and be discharged to the outside of the battery pack 100 after the baffle 152 is opened. When thermal runaway does not occur in the battery cell 3, the baffle 152 can cover the ventilation frame 151, so that impurities such as moisture or dust outside the battery pack 100 will not enter the battery pack 100 and affect the performance of the battery cell 3.

Figure 7:
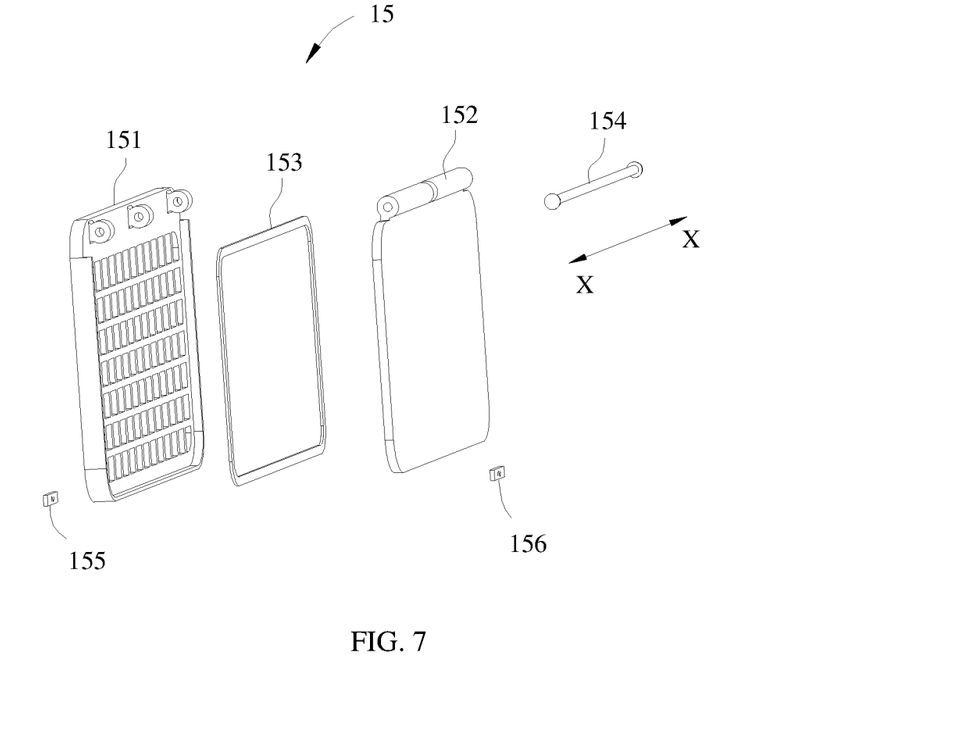
FIG. 7 is an exploded view of a structure of the exhaust assembly in the lower box body according to an embodiment of this application.
Figure 8:
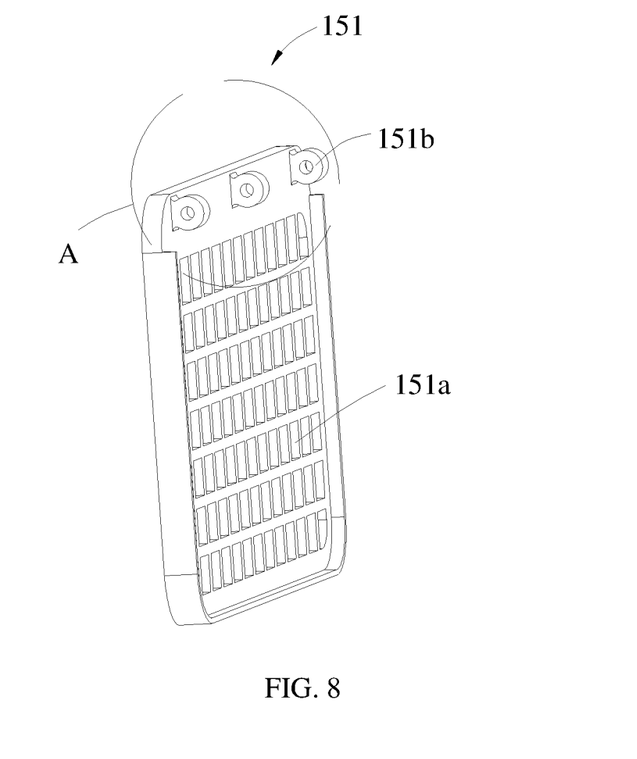
FIG. 8 is a schematic structural diagram of a ventilation frame of the exhaust assembly in the lower box body according to an embodiment of this application.
Figure 9:
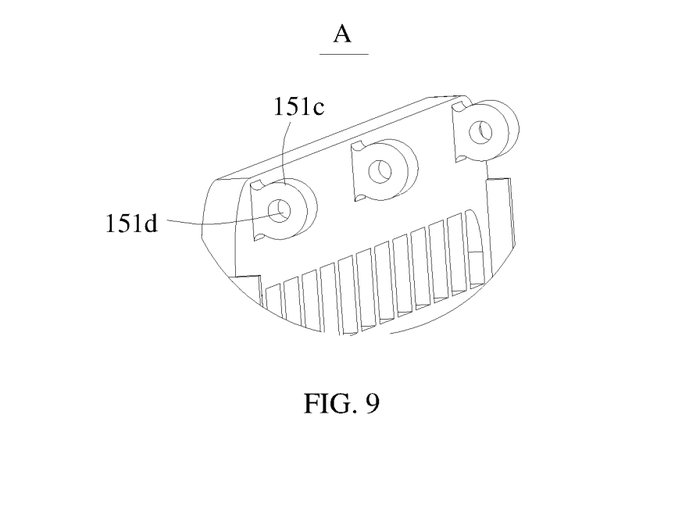
FIG. 9 is an enlarged diagram of A in FIG. 8.
Figure 10:
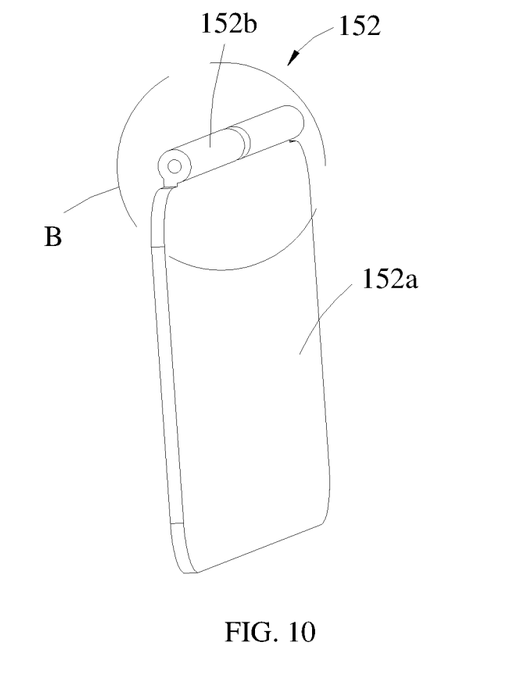
FIG. 10 is a schematic structural diagram of a baffle of the exhaust assembly in the lower box body according to an embodiment of this application.
Figure 11:
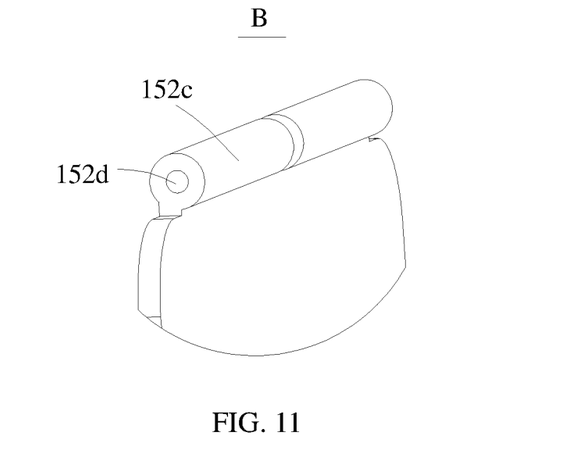
FIG. 11 is an enlarged diagram of B in FIG. 10.
Figure 12:
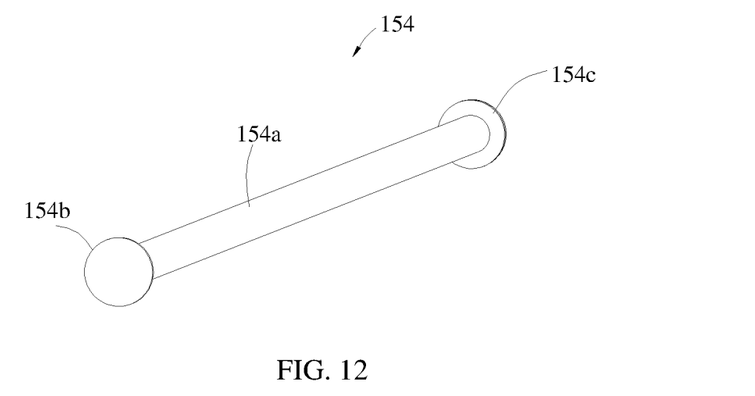
FIG. 12 is a schematic structural diagram of a rotating shaft of the exhaust assembly in the lower box body according to an embodiment of this application.

FIG. 7 is an exploded view of a structure of the exhaust assembly in the lower box body according to an embodiment of this application; FIG. 8 is a schematic structural diagram of the ventilation frame of the exhaust assembly in the lower box body according to an embodiment of this application; FIG. 9 is an enlarged diagram of A in FIG. 8; FIG. 10 is a schematic structural diagram of the baffle of the exhaust assembly in the lower box body according to an embodiment of this application; FIG. 11 is an enlarged diagram of B in FIG. 10; and FIG. 12 is a schematic structural diagram of a rotating shaft of the exhaust assembly in the lower box body according to an embodiment of this application.

As shown in FIG. 7 to FIG. 12, there are many forms of connection between the ventilation frame 151 and the baffle 152. As a possible implementation, the ventilation frame 151 includes a first body 151a and a first connection part 151b that are connected; and the first body 151a is in a mesh structure, so that high-temperature gas can penetrate the mesh structure and enter the exhaust channel 142.

The baffle 152 includes a second body 152a and a second connection part 152b that are connected; the exhaust assembly 15 further includes a rotating shaft 154; and the first connection part 151b and the second connection part 152b are rotatably connected through the rotating shaft 154.

When the pressure of the accommodating area 16 does not reach the set value, the second body 152a covers the first body 151a; and when the pressure of the accommodating area 16 reaches the set value, the second body 152a is separated from the first body 151a, so that the gas penetrates the first body 151a and enters the exhaust channel 142.

Based on the foregoing structure, an upper part between ventilation frame 151 and the baffle 152 is rotatably connected. When thermal runaway occurs in the battery cell 3, the baffle 152 can rotates so that the high-temperature gas can penetrate the ventilation frame 151 and enter the exhaust channel 142. Through the way of rotating shaft connection, the baffle 152 can open and close smoother, so as to quickly respond to occurrence of thermal runaway.

As a possible implementation, the first connection part 151b includes more than two fixing lugs 151c, and the fixing lug 151c is provided with a first fixing hole 151d; the second connection part 152b includes more than two fixing posts 152c, and the fixing post 152c is provided with a second fixing hole 152d; and each fixing post 152c is arranged between adjacent fixing lugs 151c, and the rotating shaft 154 passes through the first fixing hole 151d and the second fixing hole 152d to connect the fixing post 152c with the fixing lug 151c.

Based on the foregoing structure, a "hinge type" connection is formed between the ventilation frame 151 and the baffle 152, which is easy to realize and has a high connection reliability.

As a possible implementation, the rotating shaft 154 includes a third body 154a and a first restraint member 154b and a second restraint member 154c, the first restraint member and the second restraint member being connected to both ends of the third body 154a; the third body 154a passes through and is arranged in the first fixing hole 151d and the second fixing hole 152d; and the first restraint member 154b and the second restraint member 154c are configured to limit axial X movement of the fixing post 152c.

The first restraint member 154b and the second restraint member 154c are arranged at both ends of the third body 154a to limit the axial X movement of the fixing post 152c, thereby preventing the rotating shaft 154 from coming out, and improving the connection reliability between the ventilation frame 151 and the baffle 152.

As a possible implementation, the ventilation frame 151 is provided with a first attraction component 155; the baffle 152 is provided with a second attraction component 156; and the ventilation frame 151 and the baffle 152 are attracted through the first attraction component 155 and the second attraction component 156.

In this embodiment, by providing the first attraction component 155 and the second attraction component 156, the ventilation frame 151 and the baffle 152 can remain relatively closed when thermal runaway does not occur in the battery cell 3, thereby preventing external moisture or dust from entering the battery cell 3 and affecting the performance of the battery cell 3.

As a possible implementation, the first attraction component 155 is arranged on a side of the ventilation frame 151 away from the baffle 152; and the second attraction component 156 is arranged on a side of the baffle 152 away from the ventilation frame 151.

In the foregoing structure, the first attraction component 155 and the second attraction component 156 are located relatively far away, so that an attraction force will not be too large, and therefore, this does not cause difficulty in opening the baffle 152 and the ventilation frame 151. It may be understood that the first attraction component 155 may also be arranged on a side of the ventilation frame 151 close to the baffle 152; and the second attraction component 156 is arranged on a side of the baffle 152 close to the ventilation frame 151, which is not further limited herein.

As a possible implementation, a sealing component 153 is arranged between the ventilation frame 151 and the baffle 152.

The sealing component 153 may be a rubber ring. By providing the sealing component 153, sealing performance between the ventilation frame 151 and the baffle 152 can be improved to further prevent external moisture and dust from entering the battery cell.

As a possible implementation, a melting point of the exhaust assembly 15 is higher than a melting point of the lower box body 1. In this embodiment, the melting point of the exhaust assembly 15 is relatively high, so as to prevent the exhaust assembly 15 from being melted by the high-temperature gas when thermal runaway occurs in the battery cell 3, causing the exhaust assembly 15 to fail.

As a possible implementation, refer to FIG. 2, the lower box body 1 includes a lateral beam 11, a transverse beam 12, a medial transverse beam 13, and a medial vertical beam 14; the lateral beam 11 and the transverse beam 12 are connected end to end to form a frame structure; the medial transverse beam 13 and the medial vertical beam 14 are cross-connected in the frame structure, and the medial transverse beam 13, the medial vertical beam 14 and the lateral beam 11 and/or the transverse beam 12 form the accommodating area 16; and the exhaust assembly 15 is arranged on the medial vertical beam 14 and/or the lateral beam 11. In this embodiment, the exhaust port 141 and the exhaust assembly 15 are respectively arranged on the medial vertical beam 14 and the lateral beam 11.

As mentioned above, a plurality of battery cells 3 can form a battery array. When the plurality of battery cells 3 are placed in the accommodating area, the explosion-proof valve on the battery cell 3 will usually face the medial transverse beam 13 and the lateral beam 11. Once thermal runaway occurs in the battery cell, the high-temperature gas generated inside the battery cell 3 is ejected through the explosion-proof valve and can directly enter the exhaust channel 142, thereby avoiding diffusion of the high-temperature gas.

As a possible implementation, there are more than two accommodating areas 16; and each accommodating area 16 is provided with the exhaust port 141 and the exhaust assembly 15.

The foregoing exhaust port 141 and exhaust assembly 15 are provided for each accommodating area 16 where the battery cell 3 is placed. When thermal runaway occurs in any battery cell 3, high-temperature gas can be discharged in time to prevent adjacent or nearby battery cell 3 from thermal runaway.

As a possible implementation, the exhaust assembly 15 is welded or adhered to the lower box body 1 on the periphery of the exhaust port 141.

Specifically, the exhaust assembly 15 may be embedded in the exhaust port 141 by means of welding or adhering, to avoid occupying too much space, thereby increasing an energy density of the battery pack 100.

Certainly, the exhaust assembly 15 may also be connected to the lower box body 1 through a connector such as a bolt, and other connection methods may also be used, which is not specifically limited herein.

The embodiment of this application also provides a vehicle, including the battery pack 100 according to any embodiment of this application.

The description above is only preferable embodiments of this application, and is not used to limit this application. For a person skilled in the art, this application may have various modifications and changes. Any modification, equivalent replacement and improvement made within the spirit and principle of this application shall be included in the protection scope of this application.

What is claimed is:

1. A lower box body, wherein the lower box body has an accommodating area for accommodating a battery cell;
the lower box body is further provided with an exhaust port and an exhaust channel, and the exhaust port is in communication with the exhaust channel; the exhaust port is arranged in the corresponding accommodating area; and
the lower box body further comprises an exhaust assembly, the exhaust assembly is blocked at the exhaust port, and the exhaust assembly is configured to be open when pressure in the accommodating area reaches a set value, so that gas in the accommodating area enters the exhaust channel through the exhaust port;
wherein the exhaust assembly comprises a ventilation frame and a baffle, the ventilation frame is close to the accommodating area relative to the baffle;
the ventilation frame is connected to a periphery of the exhaust port, and the ventilation frame and the baffle are rotatably connected.

2. The lower box body according to claim 1, wherein the ventilation frame is configured to be fixed on the periphery of the exhaust port.

3. The lower box body according to claim 1, wherein when the pressure of the accommodating area does not reach the set value, the baffle covers the ventilation frame; and
when the pressure of the accommodating area reaches the set value, the baffle rotates and opens to allow the gas to penetrate the ventilation frame and enter the exhaust channel.

4. The lower box body according to claim 1, wherein a sealing component is arranged between the ventilation frame and the baffle.

5. The lower box body according to claim 1, wherein the ventilation frame comprises a first body and a first connection part that are connected; the first body is in a mesh structure.

6. The lower box body according to claim 5, wherein the baffle comprises a second body and a second connection part that are connected;
the exhaust assembly further comprises a rotating shaft;
the first connection part and the second connection part are rotatably connected through the rotating shaft.

7. The lower box body according to claim 6, wherein when the pressure of the accommodating area does not reach the set value, the second body covers the first body; and
when the pressure of the accommodating area reaches the set value, the second body is separated from the first body, so that the gas penetrates the first body and enters the exhaust channel.

8. The lower box body according to claim 6, wherein the first connection part comprises more than two fixing lugs, and a fixing lug is provided with a first fixing hole;
the second connection part comprises more than two fixing posts, and a fixing post is provided with a second fixing hole; and
each of the fixing posts is arranged between adjacent fixing lugs, and the rotating shaft passes through the first fixing hole and the second fixing hole to connect the fixing post with the fixing lug.

9. The lower box body according to claim 8, wherein the rotating shaft comprises a third body, a first restraint member and a second restraint member, the first restraint member and the second restraint member being connected to both ends of the third body;
the third body passes through and is arranged in the first fixing hole and the second fixing hole; and
the first restraint member and the second restraint member are configured to limit axial movement of the fixing post.

10. The lower box body according to claim 1, wherein the ventilation frame is provided with a first attraction component; the baffle is provided with a second attraction component; and
the ventilation frame and the baffle are attracted through the first attraction component and the second attraction component.

11. The lower box body according to claim 10, wherein the first attraction component is arranged on a side of the ventilation frame away from the baffle, and the second attraction component is arranged on a side of the baffle away from the ventilation frame.

12. The lower box body according to claim 1, wherein the lower box body comprises a lateral beam, a transverse beam, a medial transverse beam, and a medial vertical beam;
the lateral beam and the transverse beam are connected end to end to form a frame structure;
the medial transverse beam and the medial vertical beam are cross-connected in the frame structure, and the medial transverse beam, the medial vertical beam and the lateral beam and/or the transverse beam form the accommodating area; and
the exhaust assembly is arranged on the medial vertical beam and/or the lateral beam.

13. The lower box body according to claim 12, wherein the exhaust port and the exhaust assembly are respectively arranged on the medial vertical beam and the lateral beam.

14. The lower box body according to claim 1, wherein the accommodating area comprises more than two areas; and
each accommodating area is provided with the exhaust port and the exhaust assembly.

15. The lower box body according to claim 1, wherein the exhaust assembly is configured to be embedded in the exhaust port by means of welding or adhering.

16. The lower box body according to claim 1, wherein a melting point of the exhaust assembly is higher than a melting point of the lower box body.

17. A battery pack, comprising:
a battery cell;
a lower box body, wherein the lower box body has an accommodating area for accommodating a battery cell;
the lower box body is further provided with an exhaust port and an exhaust channel, and the exhaust port is in communication with the exhaust channel; the exhaust port is arranged in the corresponding accommodating area;
the lower box body further comprises an exhaust assembly, the exhaust assembly is blocked at the exhaust port, and the exhaust assembly is configured to be open when pressure in the accommodating area reaches a set value, so that gas in the accommodating area enters the exhaust channel through the exhaust port;
wherein the battery cell is accommodated in the accommodating area;
wherein the exhaust assembly comprises a ventilation frame and a baffle, the ventilation frame is close to the accommodating area relative to the baffle;

the ventilation frame is connected to a periphery of the exhaust port, and the ventilation frame and the baffle are rotatably connected.

18. The battery pack according to claim 17, wherein
when the pressure of the accommodating area does not reach the set value, the baffle covers the ventilation frame; and
when the pressure of the accommodating area reaches the set value, the baffle rotates and opens to allow the gas to penetrate the ventilation frame and enter the exhaust channel.

19. A vehicle, comprising a battery pack, the battery pack comprising:
a battery cell;
a lower box body, wherein the lower box body has an accommodating area for accommodating a battery cell;
the lower box body is further provided with an exhaust port and an exhaust channel, and the exhaust port is in communication with the exhaust channel; the exhaust port is arranged in the corresponding accommodating area;
the lower box body further comprises an exhaust assembly, the exhaust assembly is blocked at the exhaust port, and the exhaust assembly is configured to be open when pressure in the accommodating area reaches a set value, so that gas in the accommodating area enters the exhaust channel through the exhaust port;
wherein the battery cell is accommodated in the accommodating area;
wherein the exhaust assembly comprises a ventilation frame and a baffle, the ventilation frame is close to the accommodating area relative to the baffle;
the ventilation frame is connected to a periphery of the exhaust port, and the ventilation frame and the baffle are rotatably connected.

\* \* \* \* \*